July 3, 1956 P. C. GEHRING 2,752,818
PHOTOGRAPHIC TEXT CORRECTION MACHINE
Filed June 26, 1952 7 Sheets-Sheet 1

INVENTOR.
PAUL C. GEHRING
BY Laurence B. Dodds
ATTORNEY

July 3, 1956     P. C. GEHRING     2,752,818
PHOTOGRAPHIC TEXT CORRECTION MACHINE
Filed June 26, 1952     7 Sheets-Sheet 2

INVENTOR.
PAUL C. GEHRING
BY Laurence B. Dodds
ATTORNEY

July 3, 1956          P. C. GEHRING          2,752,818

PHOTOGRAPHIC TEXT CORRECTION MACHINE

Filed June 26, 1952          7 Sheets-Sheet 3

*INVENTOR.*
PAUL C. GEHRING

BY *Laurence B. Dodds*

ATTORNEY

July 3, 1956          P. C. GEHRING          2,752,818

PHOTOGRAPHIC TEXT CORRECTION MACHINE

Filed June 26, 1952          7 Sheets-Sheet 4

*INVENTOR.*
PAUL C. GEHRING
BY Laurence B. Dodds
ATTORNEY

July 3, 1956 P. C. GEHRING 2,752,818
PHOTOGRAPHIC TEXT CORRECTION MACHINE
Filed June 26, 1952 7 Sheets-Sheet 5

REEL A — TEXT

REEL B — CAPTIONS

REEL C — CORRECTIONS

REEL D — DISPLAY HEADINGS

FIG. 9

*INVENTOR.*
PAUL C. GEHRING
BY *Laurence R. Dodds*
ATTORNEY

July 3, 1956 P. C. GEHRING 2,752,818
PHOTOGRAPHIC TEXT CORRECTION MACHINE
Filed June 26, 1952 7 Sheets-Sheet 6

WORKING DUMMY
FIG. 11

MAKE-UP DUMMY
FIG. 10

*INVENTOR.*
PAUL C. GEHRING
BY *Lawrence B. Dodds*
ATTORNEY

July 3, 1956 P. C. GEHRING 2,752,818
PHOTOGRAPHIC TEXT CORRECTION MACHINE
Filed June 26, 1952 7 Sheets-Sheet 7

FINAL PAGE

FIG. 12

INVENTOR.
PAUL C. GEHRING
BY *Laurence B. Dodds*
ATTORNEY

United States Patent Office 2,752,818
Patented July 3, 1956

2,752,818

PHOTOGRAPHIC TEXT CORRECTION MACHINE

Paul C. Gehring, Brooklyn, N. Y., assignor to Fairchild Camera and Instrument Corporation, a corporation of Delaware Application June 26, 1952, Serial No. 295,736

8 Claims. (Cl. 88—24)

This invention relates to photographic printing-composing machines and, more particularly, to such machines of the type capable of utilizing columns of printed or justified typewritten copy and making up therefrom photographically reproduced complete pages of typographic material, including subject headings, captions, titles, etc., suitable for direct reproduction by photolithographic or other photographic processes. While the invention is of general application, it is particularly suitable for use in composing magazine pages in which considerable attention is given to typography, lay-out, etc.

The make-up of magazine pages at present is generally accomplished either by conventional typesetting machines and letterpresses or by the photolithographic process. The former entails high cost due to the required assembling, handling, and storing of heavy and bulky type metal and also involves a great deal of hand work in setting the headings, captions, titles, etc., in setting-up page layouts and in making authors' corrections in the galley and page proofs. While the use of the photolithographic process avoids the handling of heavy type metal, the amount of costly hand work is as great or greater, taking the form of cutting and pasting proofs or stripping, cutting, and cementing film, often involving a great many small pieces necessary to make authors' corrections in the make-up of a complete page.

At the present time, all methods of making up pages for quality magazines involve the excessive and costly hand work described. While there have been proposed certain semi-automatic apparatus for reducing the amount of the hand work, these proposals have not met with commercial success, due to their complexity, inflexibility, and other limitations on their practical usefulness.

It is an object of the present invention, therefore, to provide a photographic printing-composing machine by means of which a complete typographic page including headings, captions, and titles may be made up with a minimum of manual make-up or layout work.

It is another object of the invention to provide a photographic printing-composing machine by means of which typographical corrections and authors' corrections may be made readily from the proofs without any art work, posting, stripping and patching film.

In general, the photographic printing-composing machine of the invention utilizes printed or justified typewritten material in which the text, headings, captions, etc., may be initially set in standard uniform type size, such as 10 point type, but individually supplied from separate reels or magazines. The machine includes provisions for readily and quickly selecting material from any of the several magazines and photographing it in proper arrangement to form a complete typographic page with correct type sizes, proper spacing, and accurate location on the page.

In accordance with the invention, a photographic printing-composing machine comprises a plurality of stationary compartments each adapted to receive a copy-subject of substantially the same type size, a camera lens system, a source of illumination for the copy-subjects, a movable optical system including means for selectively refracting light from the source onto a copy-subject in any of the compartments, and means for reflecting the image of the illuminated subject to the lens system. The machine also includes a film magazine including means for feeding film to the focal plane of the lens system, the lens system having a focusing ratio adjustable to determine the magnification of the reproduced copy.

Further in accordance with the invention, there is provided in a photographic printing-composing machine of the type described a system for selectively exposing any of a plurality of copy-subjects comprising a plurality of compartments each adapted to receive a copy-subject, a source of illumination for the copy-subjects, a movable optical system including means for directing light from the source onto a copy-subject and means for directing the image of the copy-subject to the camera lens system, and means for moving the optical system selectively to illuminate a copy-subject in any of the compartments of the machine.

Further in accordance with the invention, there is provided a roll copy-subject feed mechanism comprising a feed spool for a copy-subject roll, a take-up spool for the copy-subject, and a copy-subject advancing mechanism. This mechanism includes a member for engaging the copy-subject, a single-revolution clutch connected to actuate such member, and driving means for the clutch. The feed mechanism also includes means for tripping the clutch to advance the copy-subject roll a predetermined unit distance.

Further in accordance with the invention, there is provided an adjustable focusing-ratio lens system adapted to be exposed to an exposed copy-subject and having a nominal focusing ratio of unity, comprising a plurality of parallel guideways, a lens adjustable along the guideways from a predetermined position, a film magazine adjustable along the guideways from a predetermined position, and means for independently adjusting the lens and the film magazine to adjust the focusing ratio of the system to values greater and less than unity.

Further in accordance with the invention, there is provided an apparatus for varying the film-exposure area with adjustments of the lens system comprising a pair of opposed parallel top and bottom masking elements, means responsive to the adjustment of the lens system for actuating one of the masking elements, and means responsive to adjustment of the film steps for actuating the other of the masking elements.

For a better understanding of the present invention, together with other and further objects thereof, reference is had to the following description taken in connection with the accompanying drawings, while its scope will be pointed out in the appended claims.

Fig. 11 is a photographic reproduction of a "work" dummy made up from photocopies of the text composed by the machine from the copy-subjects of Fig. 9; while

Figures 1, 8:
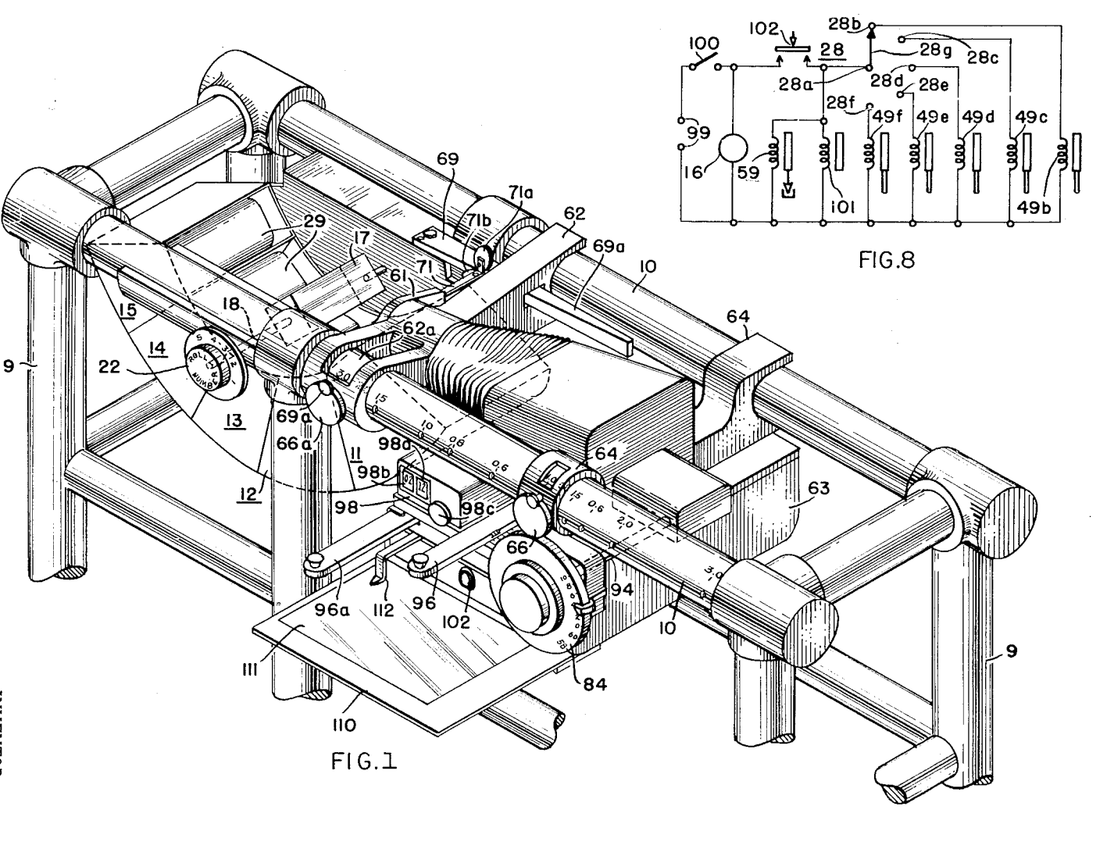
Fig. 1 of the drawings is a perspective view of a complete photographic printing-composing machine embodying the present invention.
Fig. 8 is a circuit diagram of an electrical control circuit for use in the machine of Fig. 1.

Referring now more particularly to Fig. 1 of the drawings, there is illustrated a photographic printing-composing machine embodying the present invention. This machine comprises a rigid framework 9 of any suitable type from which are supported a plurality of compartments 11, 12, 13, 14, and 15 arranged in an arcuate path and each adapted to receive a copy-subject to be reproduced. By the term "copy-subject" is meant any subject to be copied step-by-step or incrementally, for example, a continuous roll or sequence of cards which contain the typographic material to be copied.

The machine of Fig. 1 also comprises a system for selectively illuminating and exposing a copy-subject in any of the compartments 11–15, inclusive. This system is shown more clearly in Fig. 2 of the drawings and comprises a source of illumination for the copy-subjects which may be in the form of an elongated fluorescent or incandescent tubular lamp 16 mounted in a portion 9d of the frame 9. The system also comprises a movable, specifically a rotatable, optical system disposed at the center of curvature of the arcuate path in which the compartments 11–15, inclusive, are arranged and including means, such as an optical element, for directing light from the source 16 onto a copy-subject and means for directing the image of the copy-subject to the camera lens system, described hereinafter. This optical element is shown as comprising a pair of elongated right-angled prisms 17 and 18 arranged in opposition along their hypotenuse faces and having a reflective interface layer 19, such as a silver film, extending longitudinally over one half the area thereof. The optical system also includes a semi-cylindrical condenser lens 20 to focus the light from the lamp 16 into a narrow band of light on the prisms 17, 18. The prisms are effective to refract light from the source 16 through the unsilvered interface portion onto a selected copy-subject, while the interface layer 19 is effective to reflect the image of the copy-subject to the camera lens system.

Figure 2:
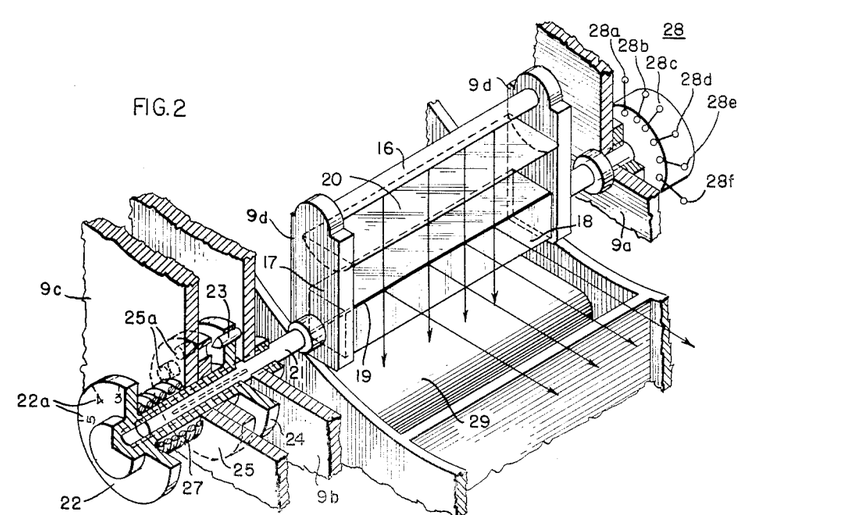
Fig. 2 is an enlarged perspective view, partly in section, of an optical system for selecting illuminating, and exposing the copy-subject in any of a plurality of copy-subject compartments of the apparatus of Fig. 1.

The system of Fig. 2 also includes means for rotating the optical element selectively to illuminate a copy-subject in any of the compartments 11–15, inclusive. This rotating means may be in the form of a shaft 21 journalled in bearings in the frame portions 9a, 9b and provided with a manually operable member, such as a knob 22. This optical system also includes an indexing mechanism for precisely setting it in a selected position to illuminate and expose a desired copy-subject. The indexing mechanism is in the form of a locating pin 23 mounted in a disc 24 secured to the knob 22 and rotating therewith. Mounted on a frame portion 9c is a disc 25 having a series of indexing holes 25a disposed in an arcuate path about the axis of the shaft 21. A helical compression spring 27 between the knob 22 and the frame portion 9c biases the pin 23 into engagement with a selected one of the holes 25a, thereby accurately to position the optical element comprising prisms 17, 18. A series of index numbers 22a on knob 22 give an indication of which copy-subject is being illuminated and exposed.

Secured to the shaft 21 is an electrical distributor or switching mechanism 28 including a series of contact terminals 28a–28f, inclusive, for purposes described hereinafter.

Figure 3:
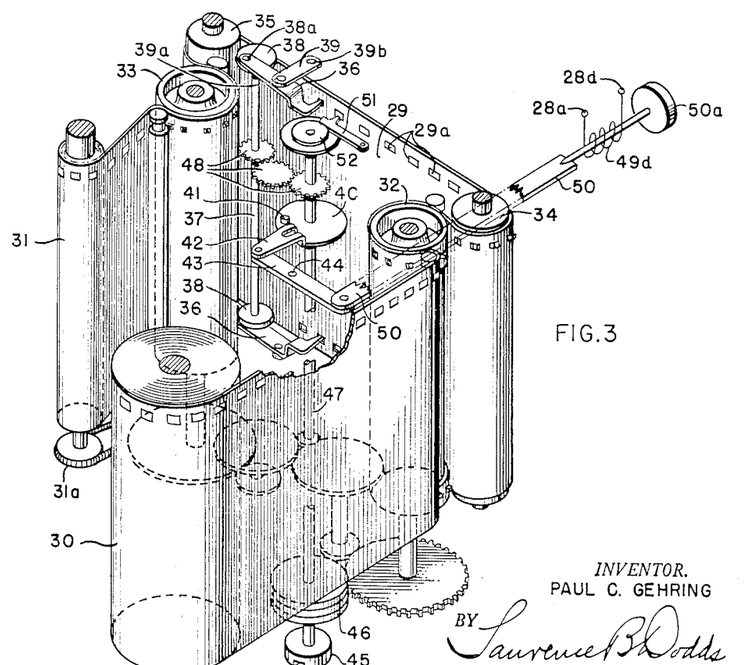
Fig. 3 is an enlarged perspective detail of a roll copy-subject feed mechanism suitable for use in the apparatus of Fig. 1.

The machine of the invention also includes a roll copy-subject feed mechanism in each of the compartments 11–15, inclusive, including means for advancing the copy-subject roll intermittently in a sequence of steps each of a predetermined unit distance. By the term "unit distance" is meant the distance represented by the spacing of elemental portions of the copy-subject, such as the lines of the typographic subject being reproduced. This feed mechanism is shown in Fig. 3 of the drawings and comprises a feed spool 30 carrying a supply of copy-subject 29 in the form of a roll of perforated strip paper. The mechanism also includes a take-up spool 31 for the copy-subject, which also passes over a pair of sprocketed driving rollers 32, 33 and a pair of idler or positioning rollers 34, 35.

The copy-subject feed mechanism also includes an advancing mechanism for advancing the copy-subject in a series of steps of predetermined unit distance. This advancing mechanism is in the form of a pair of members or advancing claws 36, 36 for engaging the perforations 29a at either margin of the copy-subject 29 and an actuating member for reciprocating the claws 36, 36. The actuating member is in the form of a shaft 37 carrying at either end a pair of discs 38, 38, each having a pin 38a engaging one end of a claw 36. Each claw 36 is supported by a link 39 pivoted at one end 39a to the claw 36 and at the other end 39b to the frame of the machine. The feed mechanism also includes a single-revolution clutch connected to actuate the advancing members described. This clutch is in the form of a disc 40 carrying a pin 41 co-operating with a latch 42 mounted on a lever 43 pivoted at 44 on the frame of the machine. There is also provided driving means for the clutch 40, 41, 42 comprising a continuously rotating power input coupling element 45 connected to drive one element of a friction clutch 46, the other element of which is mounted on and drives a shaft 47 on which the clutch disc 40 is mounted. The shaft 47 also drives the shaft 37 through suitable gearing 48, and drives the take-up spool 31 through a pulley (omitted for the sake of clarity) and an elastic belt 31a.

The feed mechanism includes means for tripping the single-rotation clutch to advance the copy-subject roll a predetermined distance. This tripping means may be in the form of a solenoid or electromagnet 49d connected to a link 50 pivotally connected to the end of the lever 43 opposite that to which the latch 42 is secured. The feed mechanism also includes a registering pin 51 engageable with the perforations 29a of the copy-subject strip 29, accurately to position the same for exposure. The registering pin 51 is driven by an eccentric 52 mounted on and driven by shaft 47. The electromagnet 49d is provided with a pair of terminals, for example, terminals 28a and 28d corresponding to similarly numbered terminals of the distributor 28 of Fig. 2. A manual release button 50a is provided in order to skip an unwanted line or lines.

In the operation of the roll copy-subject feed mechanism of Fig. 3, the input coupling element 45 is continuously rotated. When it is desired to illuminate and expose the copy-subject carried by the strip 29, the optical system of Fig. 2 is adjusted, as described above, to illuminate an appropriate line of copy-subject on the strip 29 and the desired exposure is made, as described hereinafter. The electromagnet 49 is then energized by a control circuit described hereinafter to actuate the lever 43 to withdraw the latch 42 from the pin 41 momentarily. The friction clutch 46 then drives the shaft 47 and the disc 40 through approximately one revolution until the pin 41 again engages the latch 42. During this single revolution of the shaft 47, the discs 38 are also given one revolution and through their crank pins 38a are effective to impart a single reciprocation to the claws 36. The throw of the pins of the discs 38 is such as to cause the claws 36 to advance the strip 39 a distance equal to the spacing between adjacent perforations 29a. In timed relation with this motion, the registering pin 51 is initially withdrawn and subsequently inserted into the next perforation accurately to position the copy-subject strip 29 for the succeeding exposure. It will be clear that this operation is repeated sequentially for the desired number of lines on the strip 29.

The photographic printing and composing machine of the invention also includes a camera lens system to which the portion of the copy-subject to be reproduced is exposed and a film magazine including means for feeding film to the focal plane of the lens system and advancing it in steps of adjustable length. The camera lens system may be any suitable optical system for focusing an image of a copy-subject onto an object plane and including refracting or reflecting lens elements, or both. The lens system has a nominal focusing ratio of unity and is adjustable to determine the magnification of the reproduced copy. The expression "nominal focusing ratio of unity" is used to connote a focusing ratio which has a mean or average value of the order of unity. The term "magnification" is used in its general sense as defining the ratio of the size of the reproduction to the size of the copy-subject and may have values greater or less than unity.

Figure 4:
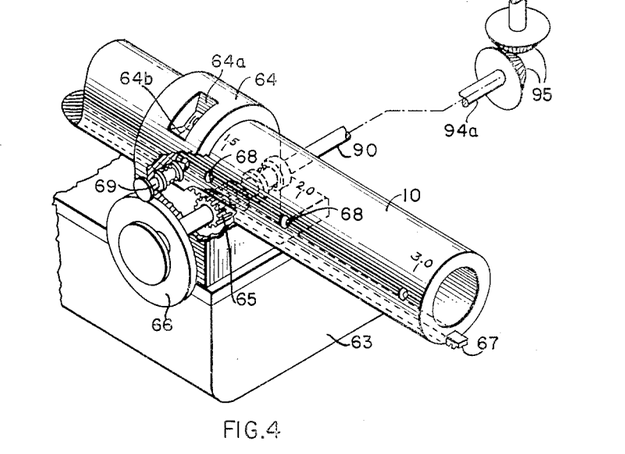
Fig. 4 is an enlarged perspective detail of a film magazine adjusting mechanism of the apparatus of Fig. 1.
Figure 5:
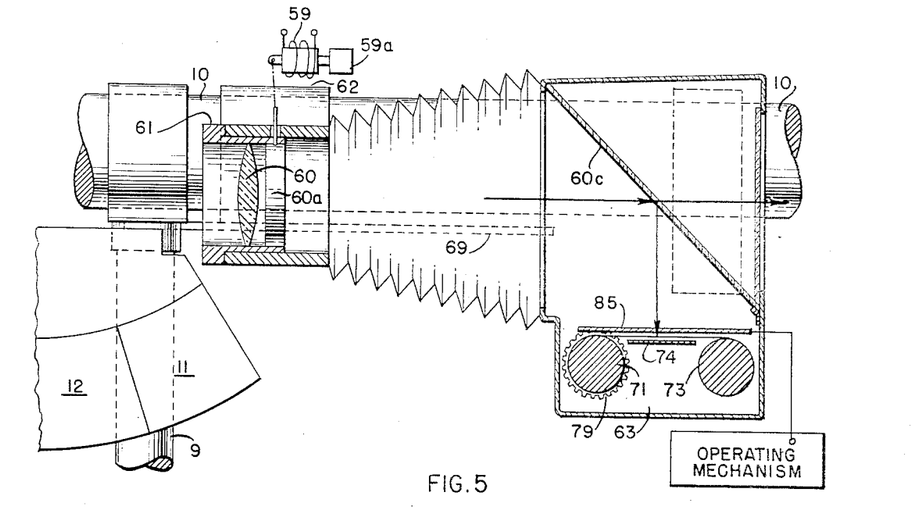
Fig. 5 is a cross-sectional view of the film magazine apparatus of Fig. 1 shown in operative relation to the camera lens system.

The camera lens system is illustrated in Figs. 1, 4, and 5 of the drawings and comprises a plurality of parallel guideways, which may be the top longitudinal members 10 of the frame 9. The lens system comprises a lens 60 and associated shutter mechanism 60a connected to be tripped by a solenoid 59 having a time-delay element such as a dashpot 59a supported in a frame or bracket member 61 which is mounted on and transversally slidable with respect to a supporting bracket 62 which, in turn, is slidable along the guideways 10, 10. The lens system also includes a 45° mirror 60c for reflecting the image vertically downward onto the film.

The machine also includes a film magazine 63 having unitary brackets 64, 64 also adjustable along the guideways 10. The adjustable lens and the adjustable film magazine are provided with means for independently adjusting their positions along the guideways to adjust the focusing ratio of the system to values greater and less than unity. The adjusting means for the lens and the film magazine may be similar, the mechanism for the film magazine 63 being shown in detail in Fig. 4. As there shown, the magazine 63 is provided with a supporting bracket 64 in which is mounted a pinion 65 having a manual operating means, such as a knob 66. The pinion 65 engages a rack 67 secured to the underside of the guideway 10. The bracket 64 has a window 64a with an index line 64b on one face thereof which is adapted to register with the upper line of focusing-ratio indicia stamped along the guideway 10. Adjacent each of the focusing indicia is a locating hole 68 with which co-operates a manually retractable locating pin 69 spring-biased into engagement with the locating hole. The adjusting means for the lens is similarly disposed in bracket 62 and includes a manual adjusting knob 66a, locating pin 69a, and window 62a for viewing the lower line of focusing-ratio indicia.

In the operation of the machine, it is necessary to adjust the lens and the film magazine independently because it is necessary to reproduce the copy-subject with values of magnification greater or less than unity, due to the fact that it is customary to set up the copy-subject on the several copy rolls in uniform type size, for example, a 10 point type, with the exception of the copy-subject roll carrying the display headings, which may be set up in somewhat larger type size, for example, 12 point type. The desired type size in the reproduced copy may then be obtained by appropriate magnification in the camera lens system. The film magazine 63 may be independently adjusted by the mechanism shown in Fig. 4 by withdrawing the locating pin 69 and turning the knob 66 until the appropriate value of focusing ratio is in register with the index line 64b of the bracket 64. The locating pin is then released and is effective accurately to position the lens. The lens is adjusted in a similar manner by operation of the knob 66a and locating pin 69a. As indicated in Figs. 1 and 4, the magnification may be varied from a value of 0.6 to 3, providing a range of type sizes in the reproduced copy of the text from 6 point to 30 point and in the display headings from approximately 7 point to 36 point type.

There follows a table giving certain specifications of a 5 inch focal length camera lens conforming to the foregoing description:

| Copy-Subject Type Size | Reproduced Type Size | Magnification | Image Distance, Inches | Object Distance, Inches | Total Image-Object Distance, Inches |
|---|---|---|---|---|---|
| 10 | 12 | 1.2 | 11.000 | 9.166 | 20.166 |
| 10 | 10 | 1 | 10.000 | 10.000 | 20.000 |
| 10 | 8 | .8 | 9.000 | 11.250 | 20.250 |
| 10 | 6 | .6 | 8.000 | 13.333 | 21.333 |
| 12 | 8 | .6 | 8.333 | 12.512 | 20.845 |
| 12 | 12 | 1 | 10.000 | 10.000 | 20.000 |
| 12 | 18 | 1.5 | 12.500 | 8.333 | 20.833 |
| 12 | 24 | 2.0 | 15.000 | 7.500 | 22.500 |
| 12 | 36 | 3.0 | 20.000 | 6.666 | 26.666 |

The lower-line of focusing-ratio indicia, with which the lens bracket 62 co-operates, while having a scale representative of magnification, is actually representative of the object distance of the lens system indicated in the next to the last column of the above table. The upper line of focusing-ratio indicia, with which the film magazine bracket 64 co-operates, also having a scale representative of magnification, is actually representative of the sum of the image and object distances found in the last column of the above table. It will be noted that this parameter has a minimum value for unity magnification so that the upper line of indicia effectively "fold over," as shown in Fig. 1.

If the focusing ratio of the camera lens system were effected solely by longitudinal adjustment of the camera lens, the dimensions of the reproduced object would vary symmetrically in all directions. However, in setting up typographic subject matter it is, of course, desired that the margins remain uniform and that the bottoms of the several lines also be uniformly spaced. This can be procured by cam means for shifting the lens laterally as it is adjusted along the guideways 10 to maintain given edges, for example, one side and the bottom edge of each reproduced copy line, in predetermined positions. This cam means is shown in Fig. 1 in the form of an elongated cam 69 extending along one of the guideways 10 and having a horizontal cam face 69a and a vertical cam face 69b together with cam follower arm 71 having rollers 71a and 71b engaging the cam faces 69a and 69b, respectively. The arm 71 is connected to the lens frame 61 to shift the lens 60 horizontally and vertically as it is adjusted along the guideways to maintain the bottom edge and the left-hand side of each line of the reproduced copy in predetermined positions, as described.

Figure 6:
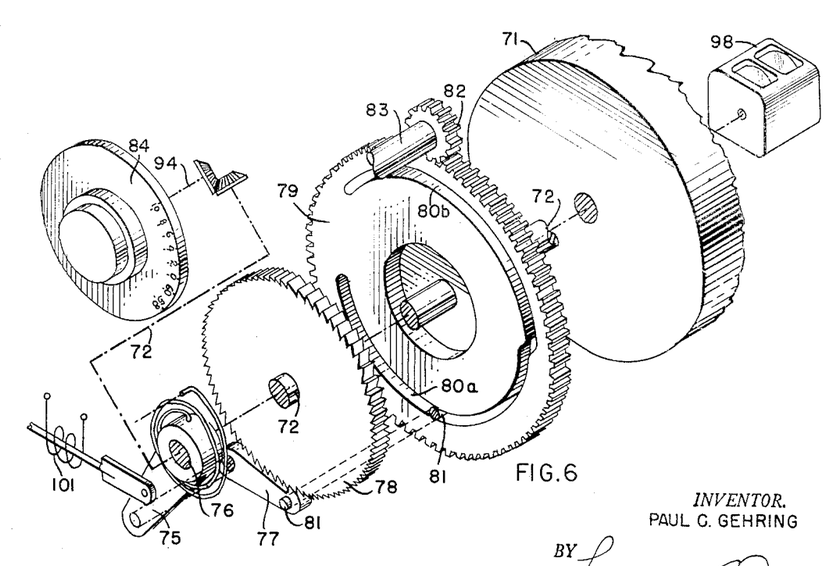
Fig. 6 is an enlarged perspective view of the film-advancing mechanism of the film magazine of Fig. 5.

In reproducing the copy-subject, the film should be advanced in steps corresponding to the line spacing of the copy being reproduced and these steps should be adjustable with adjustments in the focusing ratio of the camera lens system which, of course, adjusts the height of each reproduced line and the line-by-line spacing. A mechanism for advancing the films in such steps of adjustable length is illustrated in Figs. 5 and 6. In these figures, the film drum 71 for supplying the strip film is mounted on a shaft 72, the film passing from the drum 71 to a take-up drum 73 and over an exposure platen 74. The shaft 72 is adapted to be driven by a crank arm 75 mounted on a shaft 76 coaxial with shaft 72 and which is oscillated by any suitable manual or mechanical operating mechanism. Pivoted at the end of arm 75 is a pawl 77 registering with a ratchet wheel 78 mounted on and secured to the shaft 72 of the film drum 71. Each of the teeth of the ratchet wheel 78 corresponds to a film advance of one printer's point. Rotatably mounted on the shaft 72 adjacent the ratchet wheel 78 is a cam wheel 79 having a cam slot therein comprising one circular portion 80a of one radius and a second portion 80b of greater radius. A pin 81 extends from the pawl 77 and engages the cam slot 80a, 80b. The cam disc 79 is provided with a peripheral gearing adapted to be driven by a pinion 82 mounted on a shaft 83 provided with a manually operable control knob 84.

In the operation of the film-advancing mechanism, the crank arm 75 is oscillated through a fixed angle and imparts a fixed angular throw to the pawl 77. However, during that portion of its range of operation in which the pin 81 extending from the pawl 77 engages the outer cam slot 80b, it is lifted from the ratchet wheel 78 and is, therefore, ineffective to actuate the shaft 72 of the film drum 71. Thus the crank 75 actuates the film drum only during that portion of its range of movement in which the pin 81 engages the portion 80a of the cam slot. By manual rotation of the control knob 84, the junction between the portions 80a and 80b of the cam slot is adjusted so that the pawl 77 advances the ratchet wheel 78 by a number of teeth equal to the number of points of the type size to be reproduced. This adjusts the length of each step of the step-by-step movement of the film drum 71 in accordance with the line-to-line spacing of the reproduced copy which, in turn, corresponds to the adjustment of the magnification of the camera lens system. The manual control knob 84 is preferably provided with a suitable detent mechanism, not shown, with thirty-one positions to accommodate reproduced copy of a size range from 6 point to 36 point type size. A suitable mechanism (not shown) may be provided for reversing the motion of the strip film to return it for exposure of the top line of each successive column.

Figure 7:
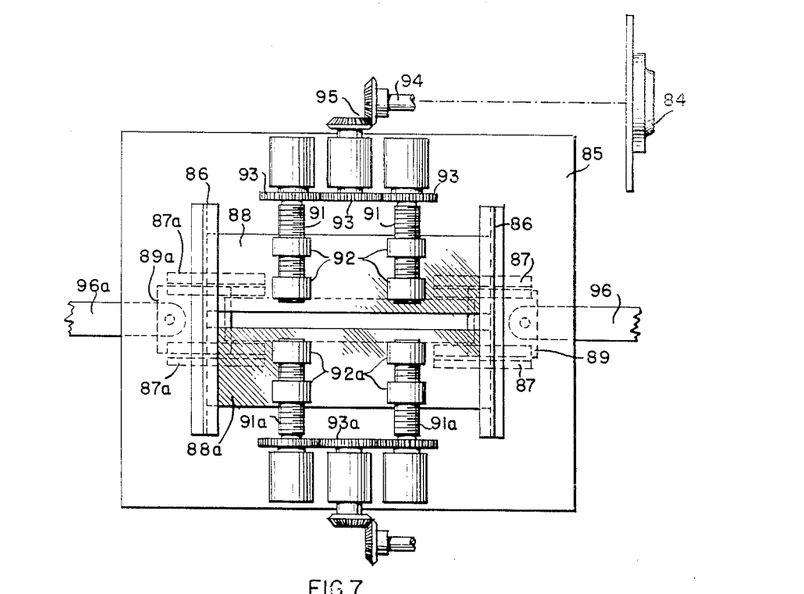
Fig. 7 is a plan view of apparatus for adjusting the film-exposure area for use in the apparatus of Fig. 1.

The photographic printing-composing machine of the invention also includes a masking unit disposed adjacent the focal plane of the camera lens system and including a plurality of masking elements adjustable in accordance with adjustments of the focusing ratio of the camera lens system for varying the film exposure area and location in accordance with the size of the reproduced copy. The masking unit is shown in detail in Fig. 7, while its relative position in the complete machine is indicated schematically in Fig. 5. This unit comprises a frame 85 including a pair of parallel guideways 86, 86 on either side thereof and a pair of parallel guideways 87, 87 on either side of the top and bottom of the maximum exposure aperture. A top mask 88 and a bottom mask 88a are disposed to slide in the vertical guideways 86, 86. Similarly, side masks 89 and 89a are disposed to slide in opposite ends of the horizontal guideways 87, 87. Any suitable mechanism may be provided for operating the several masking elements. For example, the masking element 88 is shown as being operated by a pair of screws 91, 91 engaging threaded lugs 92 secured to the masking element 88. The screws 91 are driven by suitable gearing 93 from an input shaft 94 through bevel gearing 95. The masking element 88a is driven by a similar mechanism of which the corresponding elements are identified by the same reference numerals with an added subscript "a." The side mask 89 is adjusted by a reciprocating lever 96, while the side mask 89a is similarly adjusted by a reciprocating lever 96a.

The masking unit also includes means responsive to the adjustment of the lens system for actuating one of the top and bottom masking elements and means responsive to adjustment of the film steps for actuating the other of the top and bottom elements. Specifically, the top masking element 88 is adapted to be actuated through the shaft 94 by the line spacing control knob 84 (Figs. 1 and 6), while the bottom masking element 88a is adapted to be adjusted by one of the knobs for setting type size, for example, the knob 66 (Figs. 1 and 4) which adjusts the position of the film magazine 63 and drives the shaft 94a through suitable mechanism, indicated by the dash line 90 (Fig. 4). Both of these adjustments are related directly to the size of the type being reproduced and the amount of space desired between lines. The opposed side masking elements 89 and 89a are adjustable manually by means of the levers 96 and 96a, respectively, to determine the column width and positioning, respectively. The masking elements 88, 88a and 89, 89a are proportioned so that they overlap at the corners of the film-exposure area for all adjustments thereof, so that the masking unit accurately determines the film-exposure area and prevents exposure of any unintended area. The term "top and bottom" masking elements is an arbitrary connotation referring to the masking elements in the direction of travel of the film and to differentiate from the side masking elements.

The printing-composing machine of the invention also includes a counter 98 (Fig. 1) actuated by the film drum shaft 72 (Fig. 6) for indicating, first, the amount of film exposed above the bottom edge of the line being reproduced and, second, the vertical position of the exposed line of film with respect to the top edge of the page. The counter 98 is a digital counter which may be of any well-known type commonly available on the market. It is not a simple decade counter, but counts in terms of standard printer units of "points" and "picas," that is, 12 points equal 1 pica and 6 picas equal 1 inch. Assuming that the copy is to be reproduced in terms of standard columns 12 inches in length, the counter 98 is provided with two pairs of dials, the first 98a representing points and counting from 1 to 12 (0–11+00). One cycle of the counter dial 98a causes the dial 98b to advance one digit. The counter dial 98b indicates the distance from the top of the page in picas and counts to 72, corresponding to a column of 12 inches. Thus, the counter dials 98a and 98b at all times indicate the film exposure, including the height of the line and the position of the line exposed with respect to the top of the page. The counter 98 is provided with a conventional reset knob 98c for returning it to zero reading at the beginning of each new column. The machine also may be provided with a work counter 110 provided with a ground glass screen 111 on which may be projected an image of the line of the copy-subject being reproduced, together with a pointer 112 for indicating the position on the page of the reproduced line.

The several solenoid operating mechanisms for the machine, described above, may be included in an electrical control system shown schematically in Fig. 8. This control system is energized from a pair of supply terminals 99, 99, which may be conventional commercial power line terminals. The terminals 99, 99 are connected through an on-off switch 100 to the film advance solenoid 101 and the time-delay shutter-trip solenoid 59 through a manually operable switch, such as the pushbutton switch 102. The copy-subject advancing solenoids 49b–49f, inclusive, for the copy-subject rolls in the compartments 11–15, inclusive, are also selectively energized from the terminals 99, 99 through the pushbutton switch 102 and the selector switch 28 having a movable selector contact 28g for selectively engaging any of the stationary contacts 28b–28f, inclusive, and connected to energize the solenoids 49b–49f, respectively.

Figure 9:
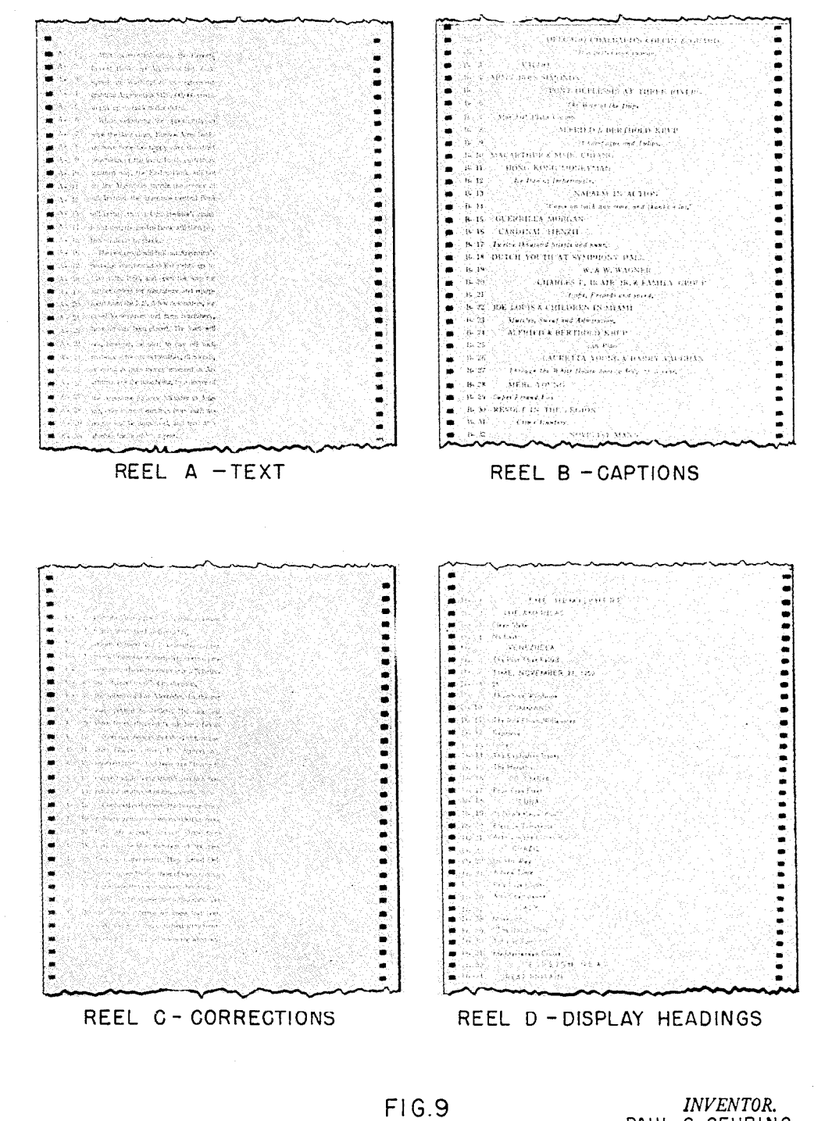
Fig. 9 is a photographic reproduction of excerpts from copy-subjects of several copy-subject rolls making up a typical text to be composed.

The operation of the photographic printing-composing machine of the invention may best be described by reference to Figs. 9–12, inclusive, showing the several steps involved in making up a magazine page for photographic reproduction. In Fig. 9, the column entitled "Reel A" represents the text only, as originally composed on a justifying typewriter, a typesetting machine, or the like. The column entitled "Reel B" comprises captions for photographs similarly composed. The column entitled "Reel C" comprises authors' corrections, changes, and additions as well as the printers' typographical corrections, this column being composed similarly to the text column. The column entitled "Reel D" includes only display headings. The copy-subjects represented by reels A–D, inclusive, may all be set in uniform standard-size type, for example, 10 point type, although reel D, representing display headings, may be set in somewhat larger type size, for example, 12 point type. It is to be noted that at the left of each line is a key symbol identifying the reel from which the line is taken and the line number on that reel. It is assumed that each of the copy-subject rolls represented by reels A–D, inclusive, is fed into a copy roll feed mechanism of the type shown in Fig. 3 which, in turn, is disposed in one of the compartments 11–15, inclusive, of the machine of Fig. 1. Each of the copy-subject feed mechanisms of Fig. 3 is initially adjusted so that a blank line immediately preceding the first line of each reel is arranged to be exposed to the camera lens system.

Figure 10:
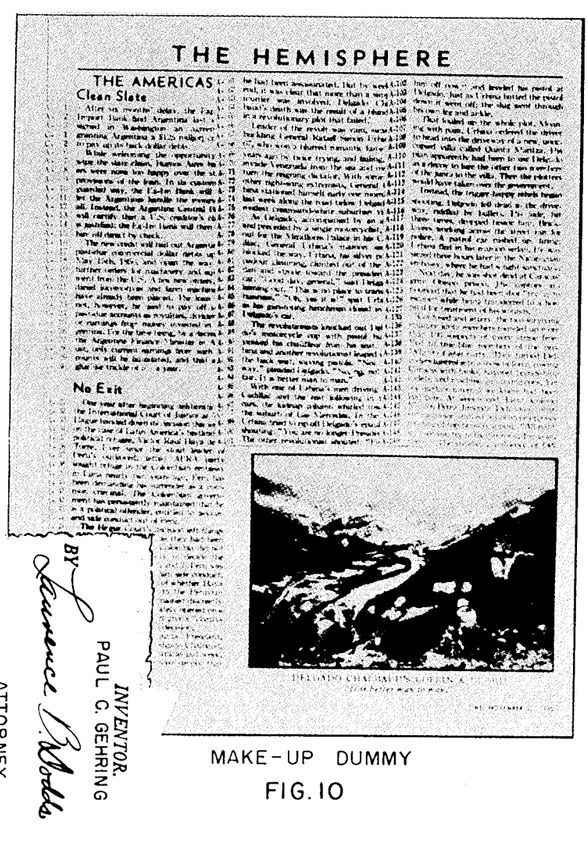
Fig. 10 is a photographic reproducion of a make-up dummy made up from photocopies of the text composed by the machine from the copy-subjects of Fig. 9.

In making up a page dummy, as represented in Fig. 10, first the page display heading "The Hemisphere" is set up. Assuming that it is desired that this heading be of maximum type size, for example, 36 point, the film magazine adjusting knob 66 and the lens position-adjusting knob 66a are both adjusted to the focusing-ratio setting of 3.0, representing a magnification of three times, so that the 12 point type of reel D is enlarged to 36 point type. The side masking elements 89, 89a of the masking unit 85 are adjusted by the levers 96, 96a, respectively, to expose a line of full column width. At the same time, the line-to-line spacing knob 84 attached to the shaft 83 of the film-advancing mechanism of Fig. 6 is adjusted to correspond to the line spacing required for a 36 point line. This adjustment also actuates the upper masking element 88 of the masking unit 85 to determine the height of the film-exposure area. The knob 22 is then actuated to select the copy-subject reel D which carries the display headings. The pushbutton switch 102 is operated and is effective to energize the solenoid 101, which advances the film mechanism of Fig. 6 through a distance corresponding to the film area to be exposed. Simultaneously through the appropriate contacts of the selector switch 28, one of the solenoids 49b–49f, inclusive, of the corresponding copy-subject feed mechanism of Fig. 3 is energized to advance the copy-subject to expose the succeeding line. After a time delay, the solenoid 59 operates to trip the shutter 60 to reproduce the first line of reel D on the film.

It will be noted in Fig. 10 that the second line is a column display heading "The Americas," which is also found on the display reel D so that the selector knob 22 is unchanged. However, the line width and positioning levers 96, 96a are adjusted to correspond to the display of a single left-hand column. The line-to-line spacing knob 84 is also adjusted to adjust the top masking element 88 to reduce the height of the film-exposure area to correspond to the smaller type size and, assuming that an 18 point column heading is desired, the film magazine adjusting knob 66 and the lens setting knob 66a are readjusted to positions corresponding to a focusing ratio of 1.5. The switch 102 is again actuated and, after a short time delay, effects the desired exposure.

The foregoing line-by-line exposure procedure is repeated in each case, selecting the appropriate line from the copy-subject rolls by means of the knob 22; adjusting the masking elements of the masking unit 85 to determine the correct film-exposure area; adjusting the focusing-ratio knobs 66 and 66a to obtain the appropriate enlargement; adjusting the line-to-line spacing knob 84 for the correct amount of film advance; exposing the film by operation of switch 102; and operating the pushbutton switch 103 to advance the previously exposed copy-subject roll to the next line and simultaneously to advance the film a distance corresponding to the width of the line just exposed.

If desired, the make-up process may be modified by the intermediate step of resetting reels A, B, and D with corrections from reel D included. In this case, the page is set-up directly from corrected reels A, B, and D. When a page has been set up, as described, photostatic or other photographically reproduced copies are made therefrom and are used to paste up a page dummy, represented in Fig. 10. This make-up dummy is then reviewed by the author and printer and, if necessary, an additional copy-subject roll of corrections made up. The process is continued until it is finally approved by author and printer.

Figure 11:
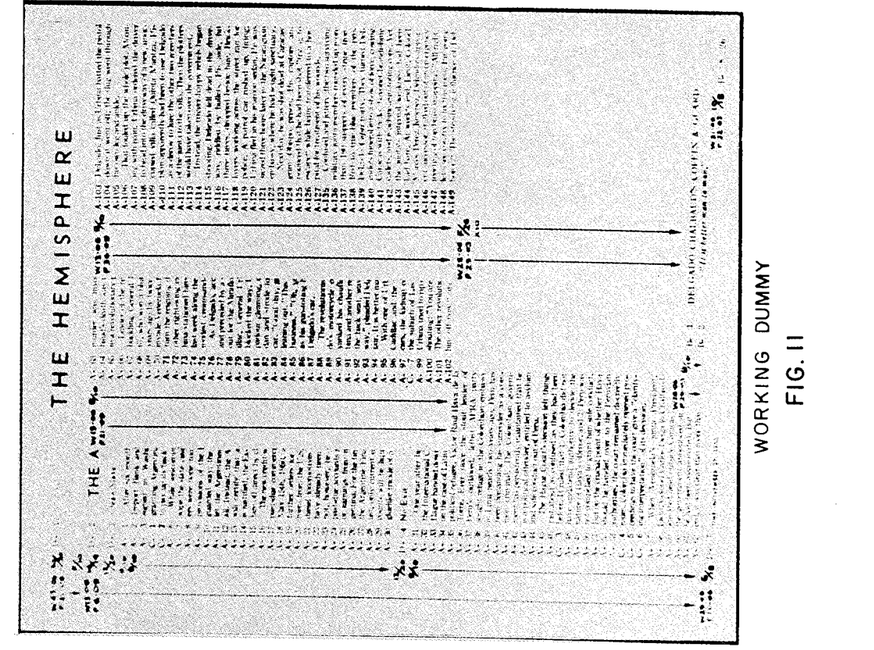
Figure 12:
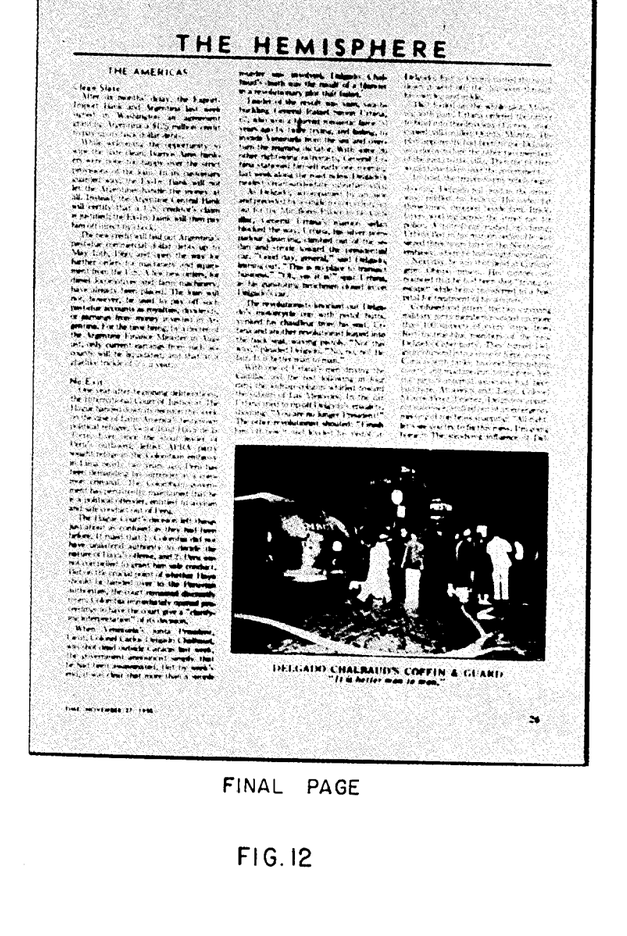
Fig. 12 is a photographic reproduction of a complete page of which the typographic material is composed by the machine from the copy-subject rolls of Fig. 9 with the aid of the working dummy of Fig. 11.

Upon approval of the make-up dummy, as described, the printer then prepares a "working" dummy, represented by Fig. 11, which is identical to the make-up dummy except for the addition of exact spacing instructions. The operator of the printing-composing machine of the invention then follows this working dummy to compose a complete page on a single negative. This negative is developed and utilized for offset or letterpress printing and is in the form of the usual final magazine page, as represented by Fig. 12 of the drawings.

Thus it is seen that, by means of the photographic printing-composing machine of the invention, the typographical material of a complete page may be made up. The machine photographically selects and assembles all typographical material, photographically enlarges it or reduces it to the correct type sizes with proper spacing and accurate location on a single sheet film. All hand work is eliminated, except for pasting up complete dummy pages. The authors' corrections and changes and the printers' corrections are also inserted by the machine, thus eliminating either resetting of lines of type, and columns including the same, involved in the use of typesetting machines and eliminating cutting and cementing many small film strips, representing changes and corrections, or photocopies thereof which are involved in the use of prior photographic composing systems.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A photographic printing-composing machine comprising: a plurality of stationary compartments each adapted to receive a copy-subject of substantially the same type size; a camera lens system; a source of illumination for the copy-subjects; a movable optical system including means for selectively refracting light from said source onto a copy-subject in any of said compartments and means for reflecting the image of said subject to said lens system; and a film magazine including means for feeding film to the focal plane of said lens system, said lens system having a focusing ratio adjustable over a wide range to effect reproduction of each copy subject in any of a wide range of type sizes.

2. A photographic printing-composing machine comprising: a plurality of compartments each adapted to receive a copy-subject; a camera lens system; means for selectively illuminating and exposing to said optical system a copy-subject in any of said compartments; a film magazine including means for feeding film to the focal plane of said optical system; said lens system having a focusing ratio adjustable to determine the magnification of the reproduced copy; a masking unit disposed adjacent said focal plane and including a plurality of adjustable masking elements; and actuating means responsive to adjustments of the focusing ratio of said lens system for adjusting said masking elements to vary the film-exposure area in accordance with the size of the reproduced copy.

3. In a photographic printing-composing machine including a lens system and a film magazine, a system for selectively exposing any of a plurality of copy-subjects comprising: a plurality of compartments arranged in an arcuate path and each adapted to receive a copy-subject; a source of illumination for the copy-subjects; a rotatable optical system disposed at the center of curvature of said arcuate path and including an optical element for refracting light from said source onto a selected copy-subject and for reflecting the image of said copy-subject to the camera lens system; and means for moving said optical system selectively to illuminate a copy-subject in any of said compartments.

4. In a photographic printing-composing machine including a lens system and a film magazine, a system for selectively exposing any of a plurality of copy-subjects comprising: a plurality of compartments arranged in an arcuate path and each adapted to receive a copy-subject; a source of illumination for the copy-subjects; a rotatable optical system disposed at the center of curvature of said arcuate path and comprising a pair of elongated right-angled prisms arranged in opposition along their hypotenuse faces and having a reflective interface layer extending longitudinally over half the area thereof, said prisms refracting light from said source onto a copy-subject and said layer reflecting the image of said copy-subject to the camera lens system; and means for moving said optical system selectively to illuminate a copy-subject in any of said compartments.

5. In a photographic printing-composing machine including a copy-subject compartment and means for exposing a copy-subject in said compartment, an adjustable focusing-ratio lens system adapted to be exposed to an exposed copy-subject and having a nominal focusing ratio of unity, comprising: a plurality of parallel guideways; a lens adjustable along said guideways from a predetermined position; a film magazine adjustable along said guideways from a predetermined position; means for independently adjusting said lens and said film magazine to adjust the focusing ratio of the system to values greater and less than unity; an elongated horizontal cam and an elongated vertical cam extending along said guideways; and cam follower means connected to said lens for shifting said lens horizontally and vertically as it is adjusted along said guideways to maintain one edge and one side of a reproduced copy in predetermined positions.

6. In a photographic printing-composing machine including a copy-subject compartment, an adjustable-focus lens system, a film magazine including adjustable means for advancing a film in steps of adjustable length, and means for exposing a copy-subject in said compartment to said lens system, an apparatus for varying the film-exposure area with adjustments of the lens system comprising: a pair of opposed parallel top and bottom masking elements; means responsive to the adjustment of said lens system for actuating one of said masking elements; and means responsive to adjustment of said film-advancing means for actuating the other of said masking elements.

7. In a photographic printing-composing machine including a copy-subject compartment, an adjustable-focus lens system, a film magazine including adjustable means for advancing a film in steps of adjustable length, and means for exposing a copy-subject in said compartment to said lens system, an apparatus for varying the film-exposure area with adjustments of the lens system comprising: a pair of opposed parallel top and bottom masking elements; means responsive to the adjustment of said lens system for actuating one of said elements; means responsive to adjustment of said film-advancing means for actuating the other of said elements; and a pair of opposed side masking elements manually adjustable to determine the line width and positioning.

8. In a photographic printing-composing machine including a copy-subject compartment, an adjustable-focus lens system, a film magazine including adjustable means for advancing a film in steps of adjustable length, and means for exposing a copy-subject in said compartment to said lens system, an apparatus for varying the film-exposure area with adjustments of the lens system comprising: a pair of opposed parallel top and bottom masking elements; means responsive to the adjustment of said lens system for actuating one of said elements; means responsive to adjustment of said film-advancing means for actuating the other of said masking elements; and a pair of opposed side masking elements manually adjustable to determine the line width and position, said masking elements overlapping at the corners of the film-exposure area for all adjustments thereof.

References Cited in the file of this patent

UNITED STATES PATENTS

| | | |
|---|---|---|
| 1,366,876 | Colter | Jan. 25, 1921 |
| 1,483,101 | MacDowell | Feb. 12, 1924 |
| 1,591,118 | Friess | July 6, 1926 |
| 2,060,334 | Moreno | Nov. 10, 1936 |
| 2,233,839 | Heurtier | Mar. 4, 1941 |
| 2,313,317 | Brenkert | Mar. 9, 1943 |
| 2,356,620 | Schade | Aug. 22, 1944 |
| 2,415,424 | Gaebel | Feb. 11, 1947 |
| 2,559,082 | Mathews | July 3, 1951 |
| 2,616,330 | Westover | Nov. 4, 1952 |
| 2,630,743 | O'Kane | Mar. 10, 1953 |